(12) United States Patent
Hochmann

(10) Patent No.: US 12,731,804 B2
(45) Date of Patent: Sep. 8, 2026

(54) METHOD AND APPARATUS FOR FABRICATING A MEMBRANE ELECTRODE ASSEMBLY

(71) Applicant: MB ATECH GmbH, Roding (DE)

(72) Inventor: Sven Hochmann, Dresden (DE)

(73) Assignee: MB AUTOMATION GMBH & CO. KG, Roding (DE)

( * ) Notice: Subject to any disclaimer, the term of this patent is extended or adjusted under 35 U.S.C. 154(b) by 686 days.

(21) Appl. No.: 18/252,070

(22) PCT Filed: Nov. 4, 2021

(86) PCT No.: PCT/EP2021/080596
§ 371 (c)(1),
(2) Date: May 8, 2023

(87) PCT Pub. No.: WO2022/096552
PCT Pub. Date: May 12, 2022

(65) Prior Publication Data

US 2023/0420716 A1 Dec. 28, 2023

(30) Foreign Application Priority Data

Nov. 6, 2020 (DE) .................... 10 2020 006 845.6

(51) Int. Cl.
*H01M 8/1004* (2016.01)
*B05B 13/02* (2006.01)
(Continued)

(52) U.S. Cl.
CPC ....... *H01M 8/1004* (2013.01); *B05B 13/0221* (2013.01); *B05C 5/0229* (2013.01); *H01M 8/0273* (2013.01); *H01M 8/0286* (2013.01)

(58) Field of Classification Search
CPC ............ H01M 8/1004; H01M 8/0273; H01M 8/0286; B05B 13/0221; B05B 12/22; B05C 5/0229; B05C 5/0254; B05C 5/0262
See application file for complete search history.

(56) References Cited

U.S. PATENT DOCUMENTS

2006/0078781 A1 4/2006 Stegink et al.
2016/0133980 A1 * 5/2016 Furuya .................... B05C 5/02 118/321
(Continued)

FOREIGN PATENT DOCUMENTS

DE 102010049548 A1 4/2012
DE 102011105180 A1 12/2012
(Continued)

*Primary Examiner* — Stewart A Fraser
(74) *Attorney, Agent, or Firm* — John A. Miller; Shumaker, Loop & Kendrick, LLP

(57) ABSTRACT

A method for fabricating a membrane electrode assembly including providing at least one carrier frame having at least one recess; continuous conveying of the carrier frame along a conveying path; applying an adhesive coating to the carrier frame while the carrier frame is conveyed along the conveying path, wherein the adhesive coating applied to the carrier frame at least partially surrounds the recess and wherein the adhesive coating is applied to the carrier frame by an uninterrupted delivery of adhesive from an applicator nozzle of an application device, wherein the applicator nozzle has a passage surface whose geometry is changed during the uninterrupted delivery of the adhesive; and placing a membrane and/or an electrode on the adhesive application.

14 Claims, 6 Drawing Sheets

(51) Int. Cl.

| | |
|---|---|
| ***B05C 5/02*** | (2006.01) |
| ***H01M 8/0273*** | (2016.01) |
| ***H01M 8/0286*** | (2016.01) |

(56) References Cited

U.S. PATENT DOCUMENTS

| | | | |
|---|---|---|---|
| 2016/0351800 A1 | 12/2016 | Kolb et al. | |
| 2016/0354800 A1 | 12/2016 | Birecki et al. | |
| 2017/0252773 A1* | 9/2017 | Scharfer | B05C 11/1034 |

FOREIGN PATENT DOCUMENTS

| | | |
|---|---|---|
| DE | 102015010440 A1 | 2/2017 |
| WO | 2010146698 A1 | 12/2010 |
| WO | 2010146998 A1 | 12/2010 |

* cited by examiner 1
40
30
20
10
26
26
20
20
26
26
40
30
26
10
20
22
24

1000
10
20
30
40
100
200
300
310
320
400
500
600
700
750
800
900
1
F 20
26
320
F
300

20
22
320
340
F
300

20
26
22
F
300
320

METHOD AND APPARATUS FOR FABRICATING A MEMBRANE ELECTRODE ASSEMBLY

CROSS-REFERENCE TO RELATED APPLICATIONS

This application is a National Stage application of International Application No. PCT/EP2021/080596 filed Nov. 4, 2021, which claims priority to German Patent Application Serial No. DE 10 2020 006 845.6 filed Nov. 6, 2020.

BACKGROUND

Field

A method and apparatus for manufacturing a membrane-electrode assembly, for example a membrane-electrode assembly for a fuel cell, are described herein.

Discussion of the Related Art

A well-known process for manufacturing a membrane electrode assembly for a fuel cell is the pick-and-place process. Here, robots or grippers arranged on rails can be used, which can execute movements in different spatial directions in order to place the different components of the respective membrane electrode assembly with the required accuracy. Such a pick-and-place process for manufacturing membrane electrode assemblies and fuel cells in large-scale production is demanding in terms of material costs and also due to the required handling of the filigree and dirt-sensitive components.

It is also known to provide a carrier for a membrane and/or an electrode as part of a continuous material web. The material web can pass through a plurality of processing stations, whereby a second component of the membrane-electrode assembly is connected to the carrier. Such a process is disclosed, for example, by document DE 10 2015 010 440 A1.

Further membrane electrode arrangements and associated manufacturing processes are known from the documents DE 10 2010 049 548 A1 and DE 10 2011 105 180 A1. Furthermore, the documents US 2016/0 351 800 A1, WO 2010/146998 A1 disclose technological background for printing processes with applicator nozzles.

A disadvantage of known manufacturing processes for membrane electrode assemblies with at least initially continuous material webs is that an adhesive or bonding agent, which bonds the components together, cannot be applied continuously to the material webs. Typically, an adhesive or bonding agent layer is applied to one of the material webs, usually to a backing layer, using a stencil or flatbed screen printing process. However, this requires at least a temporary stop of the conveyed material webs for the application of the adhesive or bonding agent layer.

Alternatively, the adhesive or bonding agent can also be applied to a continuously moving carrier layer using several dispensing nozzles. However, since the carrier layer for producing a membrane electrode assembly must always have at least one recess which is to be surrounded by the adhesive or bonding agent to be applied, several dispensing nozzles are required to produce an adhesive frame, each of which must be individually controlled and activated and deactivated in cycles in order to produce an adhesive frame surrounding the recess on the continuously conveyed carrier layer. In order to ensure a uniform thickness of the adhesive on the carrier layer, the multiple dispensing nozzles must also be connected to different feed devices which supply an adhesive quantity corresponding to the intended dispensing quantity of the individual nozzles. However, this requires a very high design effort on the one hand, and on the other hand does not produce a continuous adhesive or glue frame enclosing the recess, since the adhesive or glue coating can only be applied longitudinally to a continuous movement of the carrier layer and not transversely to a continuous movement of the carrier layer.

Thus, there is a need for an improved manufacturing process and apparatus for the manufacture of a membrane electrode assembly which, in particular, permits the application of an adhesive coating reshaping a recess to a continuously conveyed support frame.

SUMMARY

A method of fabricating a membrane electrode assembly includes the steps of:

- providing at least one carrier frame having at least one first recess;
- continuous conveying of the carrier frame along a conveying path;
- applying an adhesive coating to the carrier frame while the carrier frame is conveyed along the conveying path, wherein the adhesive coating applied to the carrier frame at least partially surrounds/encircles/forms the first recess and wherein the adhesive coating is applied to the carrier frame by an uninterrupted/interruption-free delivery of adhesive from an applicator nozzle of an application device, wherein the applicator nozzle has a passage surface whose geometry is changed during the uninterrupted delivery of the adhesive; and
- placing a membrane and/or a first electrode on the adhesive application.

The adhesive may be, for example, an adhesive suitable for fixing a membrane or electrode to the carrier frame.

The membrane in the sense of this method can in particular be a catalyst-coated membrane (CCM) for a membrane-electrode assembly, in particular for a membrane-electrode assembly for a fuel cell.

The electrode can be either an anode or a cathode, in particular an anode or a cathode in the form of a gas diffusion layer, GDL.

Optionally, the at least one carrier frame can be provided as a section of a, in particular quasi endless, carrier substrate. For example, the carrier substrate can be provided as a roll material that can be unrolled from a roll.

Furthermore, the, in particular catalyst-coated, membrane and/or the electrode can also be provided as sections of a, in particular quasi endless, membrane or electrode web material. The membrane or electrode web material can also optionally be provided as roll material that can be unrolled from a roll.

The first recess of the carrier frame can be produced in the same way as any other recesses of the carrier frame, for example, using a punching process or a milling process.

Further, the manufacturing process may include at least one of the following steps:

- placing a catalyst-coated membrane on the first electrode; and/or
- placing the catalyst-coated membrane in the first recess of the carrier frame; and/or
- applying an adhesive coating to the membrane and/or one of the electrodes, in particular to the first electrode, the applied adhesive coating at least partially encompassing a first region of the electrode and/or the membrane; and applying the adhesive coating to the electrode and/or the membrane by an uninterrupted delivery of adhesive from an applicator nozzle of a further application device, and the applicator nozzle has a passage surface whose geometry is changed at least temporarily during the uninterrupted delivery of the adhesive.

The catalyst-coated membrane can be at least partially enclosed by the electrode and the carrier frame and/or by the adhesive coating by placing the electrode on the adhesive coating.

An apparatus for fabricating a membrane electrode assembly comprises a carrier providing apparatus configured to provide at least one carrier frame for a membrane electrode assembly and a conveying apparatus configured to continuously convey the at least one carrier frame along a conveying path.

An application device with an applicator nozzle is set up to apply an adhesive coating to the continuously conveyed carrier frames, at least partially forming, surrounding or encompassing a first recess of the carrier frame, wherein the application device is also set up to apply the adhesive coating by an uninterrupted/continuous delivery of adhesive from the applicator nozzle. For this purpose, the applicator nozzle has a passage surface whose geometry is variable during the uninterrupted delivery of adhesive. Optionally, the applicator nozzle can be a slot nozzle.

The application device can, for example, have an outlet mask that is set up to at least temporarily close at least part of an outlet opening of the applicator nozzle during dispensing of the adhesive and/or to change, in particular to reduce, the geometry of the passage area of the applicator nozzle. Partial closure of the outlet opening of the applicator nozzle with the outlet mask causes, for example, a reduction in the size of the passage area of the applicator nozzle.

An advantage of this device is that the applicator nozzle can be used to apply an uninterrupted delivery of adhesive to a continuously conveyed carrier frame. The outlet mask, which temporarily closes and/or releases a part of the outlet opening of the applicator nozzle during the delivery of the adhesive and/or changes the geometry of the passage surface of the applicator nozzle, makes it possible to produce a recess in the adhesive coating. As a result, it is possible to produce/apply an adhesive coating that at least partially or completely surrounds/embraces the carrier frame without having to interrupt the continuous conveying of the carrier frame for this purpose.

Surrounding of the recess by the adhesive coating means that the adhesive coating has at least one recess on the surface of the carrier frame, which at least partially surrounds/encircles/forms the recess in the carrier frame. If the recess in the adhesive coating is completely surrounded, encircled or enclosed by the adhesive coating, so that the recess in the carrier frame is also completely surrounded or encircled by the adhesive coating on the carrier frame, the adhesive coating on the carrier frame completely encircles the recess in the carrier frame.

A further advantage is that the thickness, height and/or thickness of the respective adhesive coating can be influenced by controlling and/or regulating an adhesive supply to the applicator nozzle and, in particular, can be produced constantly and/or uniformly. In order to produce a constant/uniform adhesive coating, the adhesive supply to the applicator nozzle can be reduced, for example, for the duration of the temporary closure of a part of the applicator nozzle by the outlet mask and/or for the duration of a temporary change in the geometry of the passage surface. This allows an adhesive coating applied by a partially occluded applicator nozzle to have the same thickness/thickness/height as a portion of the adhesive coating applied by a completely unoccluded applicator nozzle with unchanged geometry of the passage surface.

A first arrangement device is adapted to arrange a first membrane and/or a first electrode on the adhesive coating. The membrane may in particular be a catalyst coated membrane (CCM) for a membrane-electrode assembly, in particular for a membrane-electrode assembly for a fuel cell. The electrode may be either an anode or a cathode, in particular an anode or a cathode in the form of a gas diffusion layer, GDL.

Optionally, the device may further comprise a punching device and/or a milling device adapted to introduce the first recess into the carrier frame by a punching process and/or a milling process.

Further, in one embodiment, the device may also include a second arrangement device configured to arrange a catalyst-coated membrane on the first electrode. The first arrangement device may further be adapted to arrange the first electrode with the catalyst-coated membrane arranged thereon on the adhesive coating. In this regard, the catalyst-coated membrane may be arranged partially or completely in the first recess of the carrier frame. Alternatively or additionally, the first arrangement device may further be adapted to arrange the electrode on the adhesive coating in such a way that the catalyst-coated membrane is at least partially enclosed/enclosed by the electrode and the carrier frame and/or the adhesive coating. In other words, the first arrangement device may be arranged to arrange the electrode on the adhesive coating in such a way that the catalyst-coated membrane is arranged between the first electrode and the carrier frame.

An advantage here is that, in a first manufacturing step, a catalyst-coated membrane can be arranged on the first electrode and that, in a second manufacturing step, the first electrode can be arranged together with the membrane arranged thereon on the carrier frame and/or the adhesive coating applied to the carrier frame. Hereby, the manufacturing of the membrane-electrode-arrangement can be facilitated and, at the same time, a manufacturing accuracy can be increased. Further, compared to sequentially arranging the membrane and the first electrode, a length of a production line for a membrane-electrode assembly can be reduced thereby. The electrode and/or the membrane can each be provided as electrode or membrane sections or as continuous web material, and/or arranged as electrode or membrane sections or as continuous web material on each other and/or on the adhesive coating.

The first and/or the second arrangement device can each have one or more vacuum drums, which are set up in particular for slip-free handling of the conveyed carrier frames and/or membranes and/or electrodes.

In a further embodiment, the apparatus may further comprise an inflow controller configured to affect an amount of the adhesive supplied to the application apparatus and thereby determine the thickness or thickness of the adhesive coating. Further, the inflow controller may also be adapted to determine a start and/or an end of dispensing of the adhesive by the application device.

In particular, the inflow controller can be set up to influence/control the amount of adhesive supplied to the applicator device in such a way that the adhesive coating applied by the applicator nozzle always has the same thickness or thickness. In other words, it can be described that the inflow controller can be arranged to influence/control the amount of adhesive supplied to the applicator device in such a way that a temporary partial closure and/or a temporary complete release of the applicator nozzle by the outlet mask or a change in the geometry of the passage surface of the applicator nozzle does not change or does not influence the thickness or the thickness of the adhesive coating applied by the applicator nozzle. To this end, a control of the outlet mask that controls a temporary partial closure and/or a temporary complete release of the applicator nozzle by the outlet mask may be coupled to the inflow controller. The inflow controller may reduce the amount of adhesive delivered to the applicator device by the applicator nozzle when the outlet mask closes at least a portion of the outlet opening of the applicator nozzle during delivery of the adhesive. Alternatively or supplementally, the inflow controller may increase the amount of adhesive supplied to the application device with the applicator nozzle if the outlet mask does not close the outlet opening of the applicator nozzle during dispensing of the adhesive.

One advantage of this is that the thickness of the adhesive coating applied by the applicator nozzle can be made constant on the carrier frame without the need to control, move, change or influence the applicator nozzle as such. Furthermore, complex geometries for the adhesive coating can be realized and, on the other hand, the design of the application device can be simplified and made particularly error-resistant. In contrast to several applicator nozzles, for example positioned next to each other, for applying several parallel adhesive beads to a continuously moving carrier frame, an adhesive coating with a flat contact surface for the membrane and/or electrode can be produced in this way, for example by using a slot nozzle as the applicator nozzle, which in particular has no depressions between individual adhesive beads. The occurrence of unintentional air pockets between the carrier frame and the mem¬brane and/or electrode when the latter are placed against each other can thus be avoided.

In one embodiment, the fabrication device may further comprise first further application apparatus and/or second further application apparatus, each constructed and arranged to correspond to the application apparatus, wherein the first further application apparatus and/or the second further application apparatus are arranged to respectively apply an adhesive coating to a membrane and/or to an anode.

In one embodiment, the device may further comprise a pressing device arranged and configured to press the carrier frame against the membrane and/or the electrode, and/or an adhesive curing device arranged and configured to cure the adhesive coating. In particular, the curing device may be an oven. In a further embodiment, the device may also comprise a combined pressing and curing device arranged to both press the carrier frame against the membrane and/or the electrode and to heat it, for example with heated pressing plates.

Further, the apparatus may include a separating device arranged and configured to separate a plurality of carrier frames continuously conveyed along a conveying path, for example, a plurality of carrier frames provided as continuous web material.

Optionally, an inspection device may be arranged and configured to detect a property defect and/or an arrangement defect of the membrane and/or electrode arranged on the adhesive coating.

For this purpose, the inspection device can in particular have at least one optically detecting sensor, for example a camera sensor, which is arranged and designed to determine a positional and/or property error of the membrane and/or electrode arranged on the adhesive coating. Depending on this determination, a conveyed carrier frame with a membrane arranged thereon and/or with an electrode arranged thereon can be conveyed into a reject receptacle or into a deposit device.

The first and/or the second arrangement device can each have at least one vacuum drum.

BRIEF DESCRIPTION OF THE DRAWINGS

Further features, characteristics, advantages and possible variations will become clear to a person skilled in the art from the following description, in which reference is made to the accompanying drawings. Here, the figures schematically show respective examples of a membrane-electrode assembly and a manufacturing device for a membrane-electrode assembly.

DETAILED DESCRIPTION OF THE EMBODIMENTS

Unless explicitly stated otherwise, matching devices and device components or those with comparable functions are given matching reference signs in schematic FIGS. 1 to 6.

Figure 1:
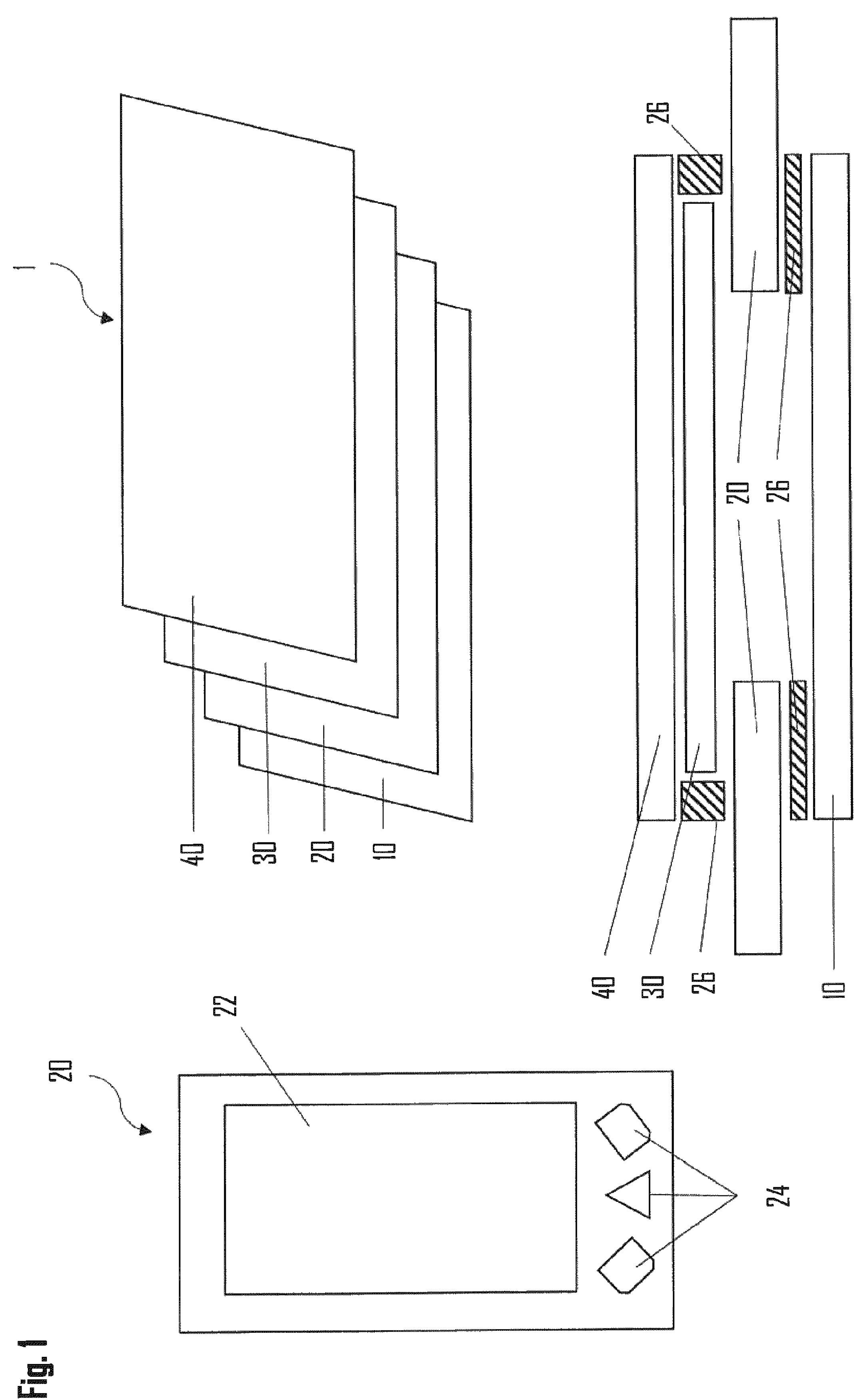
FIG. 1 shows an example of a carrier frame and a membrane-electrode assembly.

FIG. 1 shows a carrier frame 20 for a membrane electrode assembly 1. The carrier frame 20 has a first recess 22 and several further recesses 24. In the example shown, the carrier frame 20 is already separated from a web material comprising several carrier frames. However, this is not absolutely necessary for manufacturing a membrane electrode assembly. Rather, several membrane-electrode arrangements can alternatively be manufactured on a continuous carrier web material with several carrier frames and then separated from each other.

Furthermore, FIG. 1 schematically shows the structure of a membrane electrode assembly 1 to be manufactured. The membrane electrode assembly 1 comprises the carrier frame 20 with the first recess 22. The first recess 22 is here formed by an adhesive coating 26, which is applied to the carrier frame 20. A catalyst-coated membrane 30 and a cathode 40 are arranged on the carrier frame 20 with the adhesive coating 26. On the surface of the carrier frame 20 facing away from the cathode 40, another adhesive coating 26 and an anode 10 are arranged. In the example shown, the cathode 40 and the anode 10 are each designed as a layered electrode.

As shown in FIG. 1, the catalyst-coated membrane 30 may be disposed on a surface of the cathode 40, with both the cathode 40 and the membrane 30 disposed on the carrier frame 20 with the adhesive coating 26 applied thereto. Optionally, both at least a portion of the membrane 30 and a portion of the cathode 40 may be disposed directly on the adhesive coating 26 in this regard.

Figure 2:
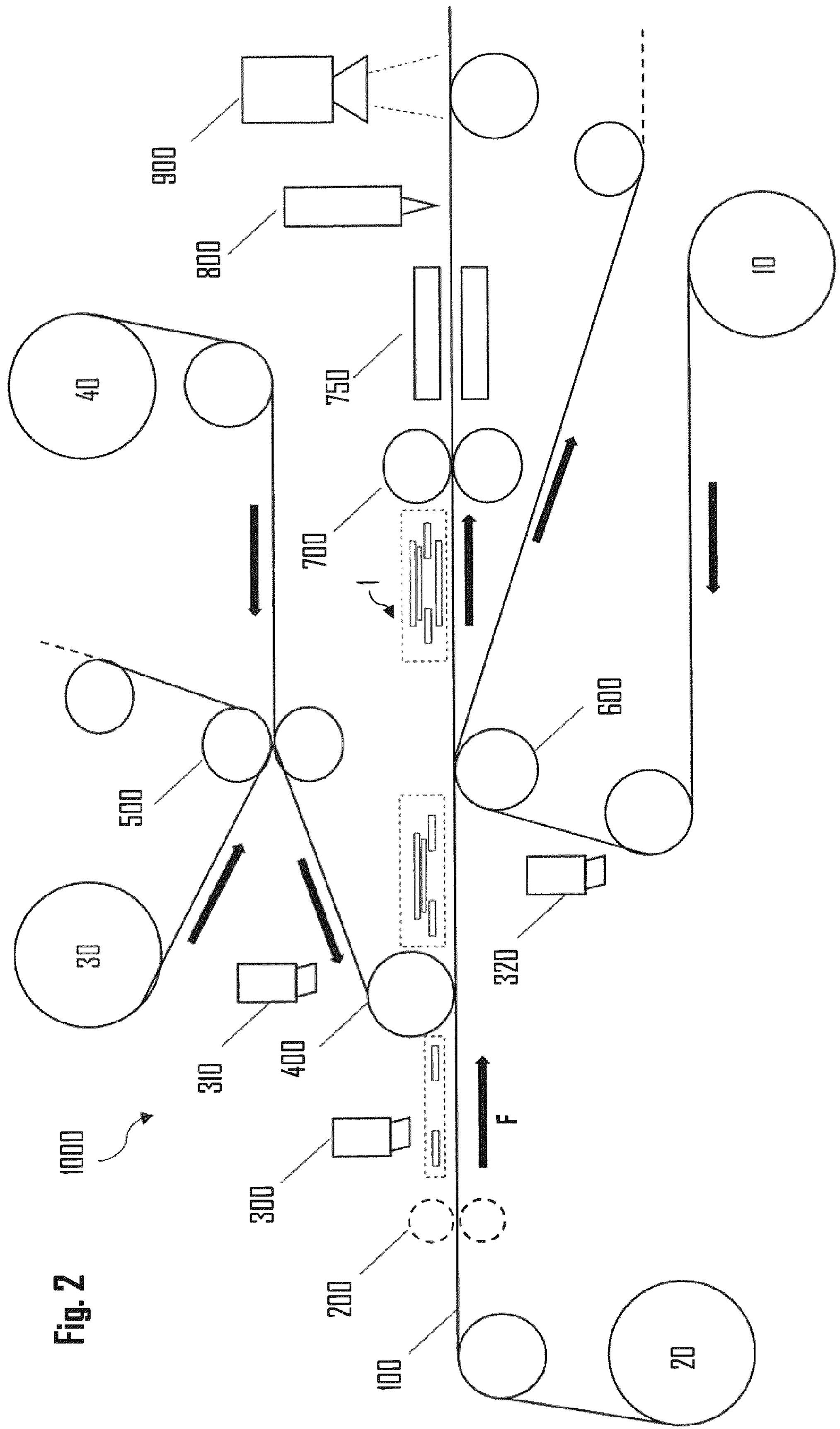
FIG. 2 shows an example of a device for the production of a membrane-electrode assembly.

FIG. 2 shows an example of a device 1000 for manufacturing membrane electrode assemblies 1.

In the example shown, several carrier frames 20 are provided as continuous quasi-infinite roll material and are continuously conveyed by a conveyor device 100 in the conveying direction F past various manufacturing stations. The manufacturing stations here each perform processing steps for the manufacture of a membrane electrode assembly and/or provide manufacturing components for the same.

In a first exemplary processing step, a punching device 200 introduces the first recess 22 and the further recesses 24 into the carrier frame 20. During the insertion of the first recess 22 and/or the further recesses 24, the carrier frame 20 can continue to be conveyed continuously in the conveying direction. Depending on the embodiment, the first recesses 22 as well as the further recesses 24 may be introduced into the carrier frame by the same or by different devices. In alternative embodiments of the manufacturing device 1000, the carrier frames 20 can also be provided with recesses 22, 24 already inserted, so that the punching device 200 for manufacturing membrane electrode assemblies can also be dispensed with.

Subsequently, in the example shown, a frame-like adhesive coating 26 is applied to the carrier frame 20, which reshapes the first recess 22 of the carrier frame 20. For this purpose, the apparatus 1000 comprises the application device 300, which will be explained in more detail below. The continuous conveying of the carrier frame 20 by the conveying device 100 is not interrupted during the application of the adhesive coating 26.

Further, the disclosed device 1000 includes a first arrangement device 400 that arranges each of a catalyst-coated membrane 30 and a cathode 40 onto the carrier frame 20 containing the adhesive applications 26. The first arrangement device 400 includes, for example, a vacuum drum that enables slip-free handling of the device components and arranges both the membranes 30 and the cathodes 40 onto the continuously conveyed carrier frame 20. This is made possible by the fact that the provided membranes 30 as well as the provided cathodes 40 are already arranged or connected to each other beforehand by a second arrangement device 500, which also comprises a vacuum drum, and are thus each provided as a membrane-cathode combination.

In other words, it can be described that the first arrangement device 400 is adapted to arrange a first electrode on each of the carrier frames 20 with the adhesive applications 26, wherein a catalyst-coated membrane 30 is arranged on a surface of each of the electrodes facing the carrier frames 20 during the arrangement, so that the membranes 30 are arranged after the arrangement each between the carrier frames 20 and the electrodes are arranged and/or are arranged in the first recess of the carrier frames 20.

Furthermore, the device shown has a further arrangement device 600, which likewise comprises a vacuum drum and is set up to arrange an anode 10 on a side of the carrier frames 20 facing away from the cathode 40 in each case. For this purpose, a further adhesive coating can be arranged beforehand either on the anode 10 or on the side of the carrier frames 20 facing away from the cathode 40.

Analogous to the carrier frames 20, the membranes 30, the cathodes 40, and/or the anodes 10 may each be provided individually or as a continuous quasi-infinite web material that is separated from one another before, during, or after fabrication of the membrane-electrode assemblies.

For example, after being singulated from the continuous quasi-infinite web material, the membranes 30 may be adhesively disposed on the continuous quasi-infinite web material from which the cathodes 40 or anodes 10 are singulated. Further, the manufacturing apparatus 1000 shown includes a pressing device 700 and an adhesive curing device 750. The pressing device 700 is arranged and configured to press the electrodes 10, 40 against the membrane 30 and/or the carrier frame 20. The adhesive curing device 750 is arranged and configured to heat and thereby cure the membrane electrode assembly 1.

In one embodiment, the fabrication device 1000 may further comprise first further application device 310 and/or second further application device 321, each constructed and arranged to correspond to the application device 300, wherein the first further application device 310 and/or the second further application device 321 are arranged to respectively apply an adhesive coating to the membranes 30 and/or to the anodes 10.

After the adhesive coating has cured, the individual carrier frames 20 or fabricated membrane electrode assemblies 1 can be separated from each other using a separating device 800. As already explained with respect to FIG. 1, however, the separation of the carrier frames 20 from one another does not have to occur at this point. Alternatively, the membrane electrode assemblies can also be manufactured with individual carrier frames which have already been separated from each other before or during the arrangement of the membrane 30 and/or the electrodes 10, 40.

FIG. 2 further shows the inspection device 900, which comprises at least one camera sensor and is set up to determine position and/or property errors of the manufactured membrane electrode assemblies 1 on the transport device 100. Depending on this determination, the membrane electrode assemblies 1 can be conveyed by the transport device 100 either into a reject receptacle or into a deposit device.

Figure 3:
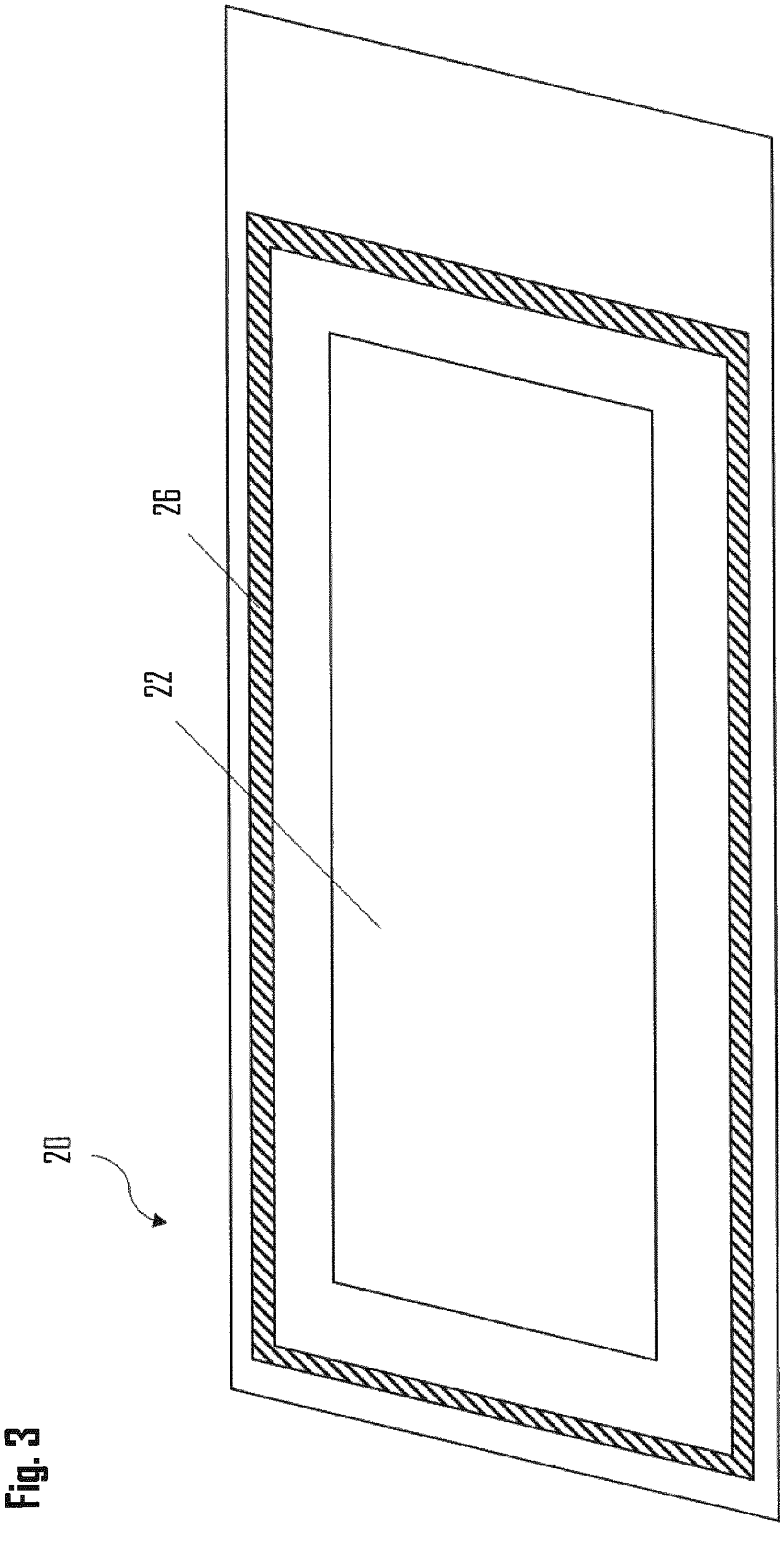
FIG. 3 shows an example of a carrier frame with an adhesive coating.

FIG. 3 shows an example of a carrier frame 20 having a first recess 22 and an adhesive coating 26 applied to the carrier frame 20 to completely form the first recess 22. Optionally, the carrier frame shown may also have further recesses, but these are not shown in FIG. 3 for reasons of overview.

Figure 4:
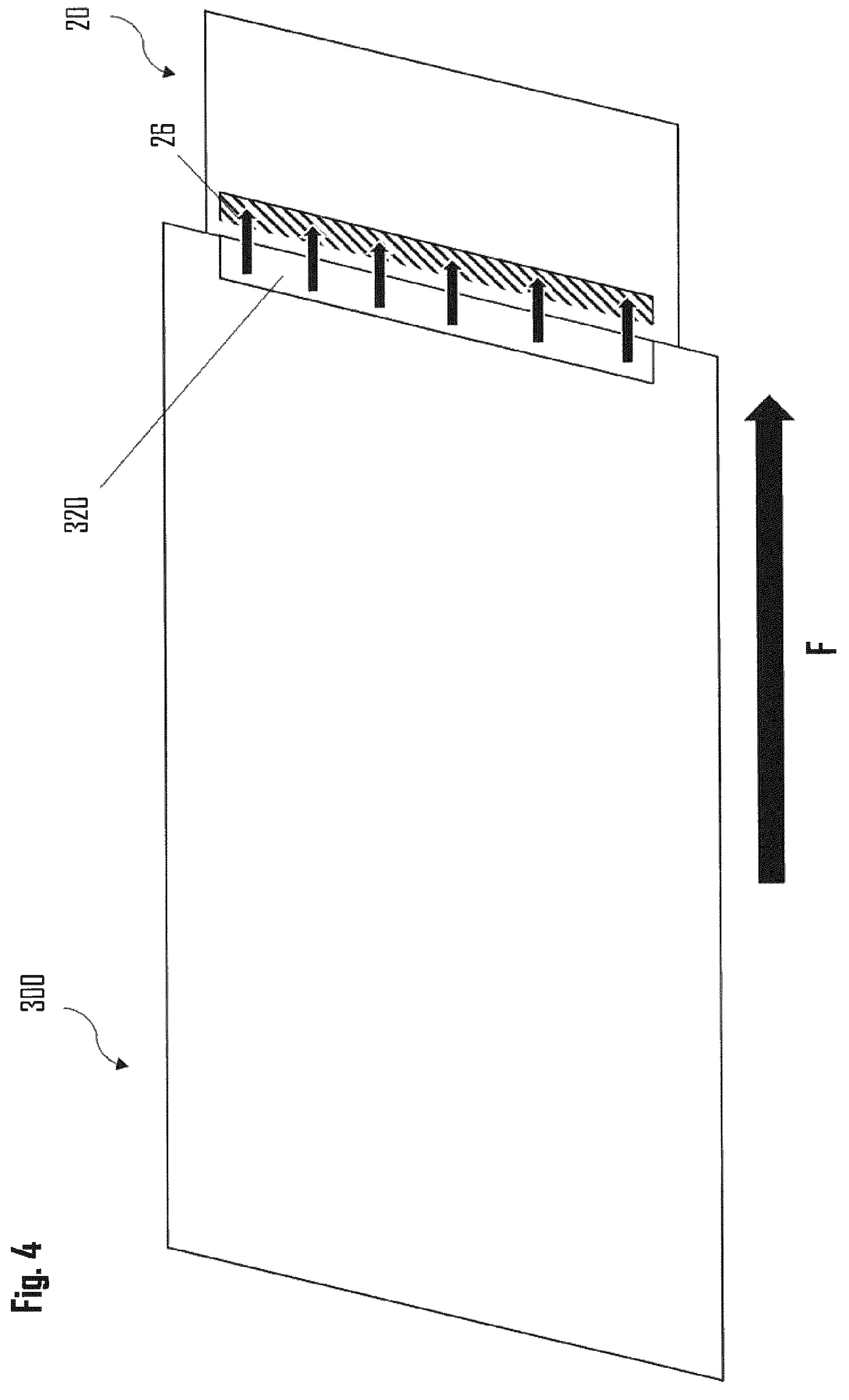
FIGS. 4-6 show an example of an application device with a slot-shaped applicator nozzle.

As shown in FIG. 4, the adhesive coating 26 can be applied to the carrier frame 20 using the application device 300. For this purpose, the application device 300 shown in FIG. 4 has a slotted nozzle 320 from which the adhesive 26 is applied to the carrier device. The adhesive is supplied to the application device 300 for this purpose from an adhesive supply device not shown. As shown schematically in FIG. 4, the slot nozzle 320 can be used to apply a two-dimensional adhesive coating 26 with a constant thickness or thickness to the carrier frame 20.

Figure 5:
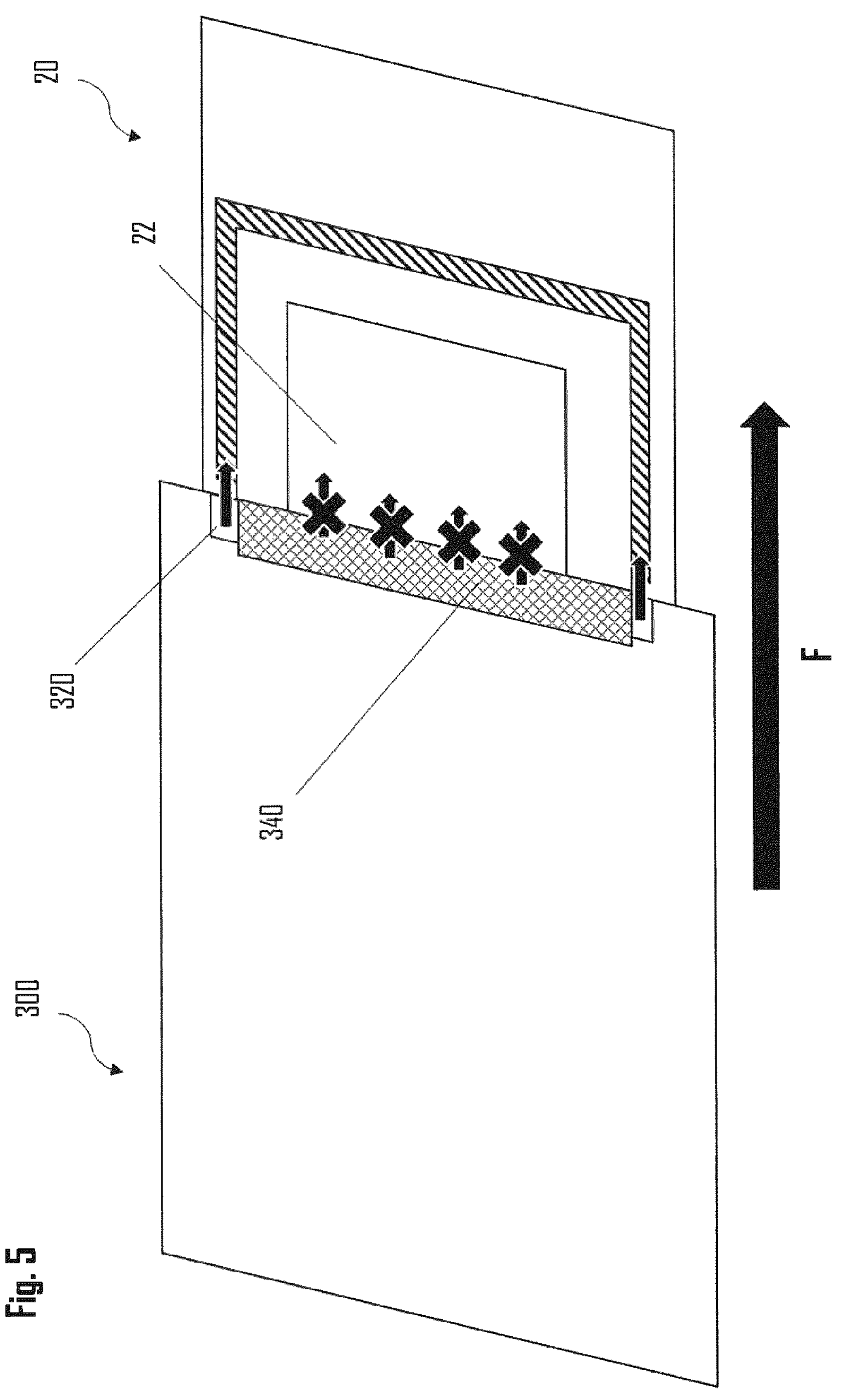

As shown in FIG. 5, in order to produce an adhesive coating 26 surrounding the first recess 22, a portion of the slot nozzle 320 may be temporarily closed by an outlet mask 340 while the carrier frame 20 is continuously conveyed in the conveying direction F by the conveying device 100. As a result, only the unsealed portions of the slot nozzle 320 dispense adhesive or arrange an adhesive coating 26 on the carrier frame 20, which surrounds the first recess 22 in the carrier frame 20.

In other words, it can be described that the geometry of the passage area of the slot nozzle 320 is at least temporarily changed by the outlet mask 340. More specifically, the passage area of the slot nozzle 320 is at least temporarily reduced by the outlet mask 340.

To maintain a constant thickness or thickness of the adhesive coating 26 applied to the carrier frame 20, an inflow controller not shown can reduce the amount of adhesive supplied to the application device 300 for the duration of the partial closure of the slot nozzle 320 by the outlet mask 340. A closed loop control or an open loop control of the application device 300, in particular the outlet mask 340, may be coupled to the inflow controller for this purpose.

Figure 6:
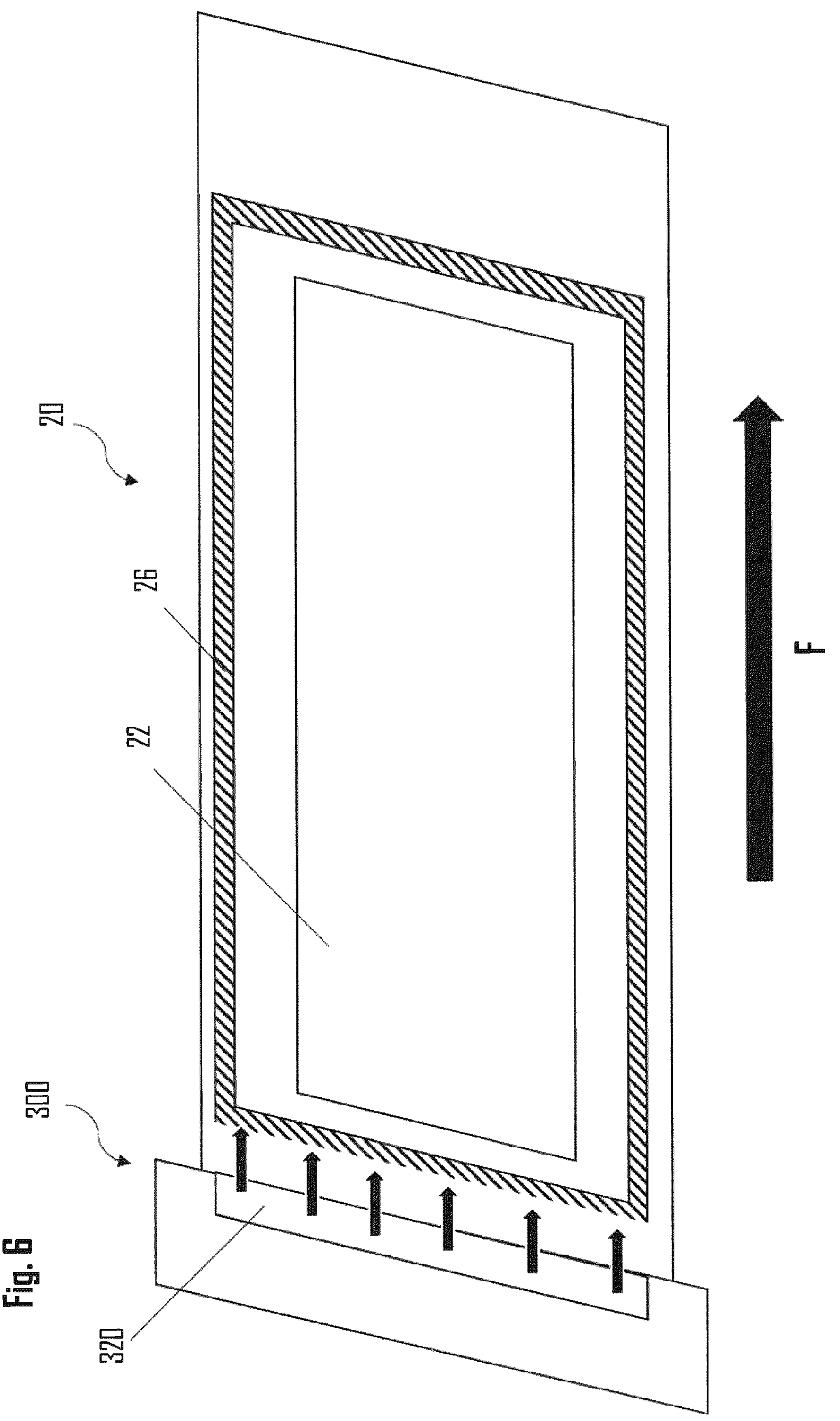

As shown in FIG. 6, after a predetermined period of time or after a certain conveying progress of the carrier frame 20, the outlet mask 340 may fully or partially uncover the slot nozzle 320 again. In other words, after a predetermined period of time or after a certain conveying progress of the carrier frame 20, an original geometry of the passage surface of the slot nozzle 320 may be restored. As a result, an adhesive coating 26 partially or completely surrounding the first recess 22 can be applied to the carrier frame 20 without having to interrupt the continuous conveying of the carrier frame 20 for this purpose. The inflow control system may again increase the amount of adhesive supplied to the application device 300 after the slot nozzle 320 is fully or partially released by the outlet mask 340, to ensure a constant thickness or thickness of the adhesive coating 26.

The invention claimed is:

1. A method for manufacturing a membrane electrode assembly comprising:

providing at least one carrier frame having at least one recess;

continuous conveying the carrier frame in a conveying direction;

applying an adhesive coating to the carrier frame while conveying the carrier frame in the conveying direction, wherein the adhesive coating applied to the carrier frame surrounds the recess, the adhesive coating is applied to the carrier frame by a continuous delivery of adhesive from an applicator nozzle of an application device, and the applicator nozzle is controllable so that the adhesive is dispensed completely around the recess in the carrier frame without being deposited in the recess during the continuous delivery of the adhesive; and placing a membrane and/or an electrode on the adhesive coating.

2. The method according to claim 1, wherein the at least one carrier frame is provided as a portion of a support substrate, and/or the recess of the carrier frame is produced using a punching or milling process.

3. The method according to claim 1, further comprising:

placing a catalyst-coated membrane on the electrode; and/or placing the catalyst-coated membrane in the recess of the carrier frame.

4. The method according to claim 3, wherein the placement of the catalyst-coated membrane on the electrode takes place in time before the placement of the electrode on the adhesive coating.

5. The method according to claim 3, wherein the catalyst-coated membrane is at least partially enclosed by the electrode and the carrier frame and/or the adhesive coating due to the arrangement of the electrode on the adhesive coating.

6. The method according to claim 1, wherein the applicator nozzle is a slot nozzle, and/or the applicator nozzle is controlled with an outlet mask, and/or a passage area of the applicator nozzle is at least temporarily reduced by the outlet mask, and/or the applicator nozzle is at least temporarily partially closed by the outlet mask.

7. The method according to claim 1, wherein an inflow controller influences an amount of the adhesive supplied to the application device and thereby determines a thickness of the adhesive coating, and/or the inflow controller determines a start and/or an end of the delivery of the adhesive by the application device.

8. An apparatus for manufacturing a membrane electrode assembly comprising:

a carrier providing device adapted to provide at least one carrier frame for the membrane electrode assembly;

a conveying device adapted to continuously convey the at least one carrier frame in a conveying direction;

an application device adapted to apply an adhesive coating encompassing a recess of the carrier frame onto the continuously conveyed carrier frame, wherein the application device includes an applicator nozzle that is controlled to apply the adhesive coating so that the adhesive is dispensed completely around the recess in the carrier frame without being deposited in the recess by a continuous delivery of adhesive, and the applicator nozzle has a variable passage surface in its geometry during the continuous delivery of the adhesive; and a first placement device adapted to place a membrane and/or an electrode on the adhesive coating.

9. The apparatus according to claim 8, further comprising:

a punching and/or milling device adapted to introduce the recess into the carrier frame by a punching or milling process.

10. The apparatus according to claim 8, further comprising:

a second placement device adapted to place a catalyst-coated membrane on the electrode and/or in the recess of the carrier frame.

11. The apparatus according to claim 10, wherein the first placement device is further adapted to arrange the electrode on the adhesive coating such that the catalyst-coated membrane is at least partially enclosed by the electrode and the carrier frame and/or the adhesive coating.

12. The apparatus according to claim 8, further comprising:

an outlet mask adapted to change the geometry of the passage surface of the applicator nozzle at least temporarily, wherein the applicator nozzle is a slot nozzle, and/or the outlet mask is arranged to reduce a passage area of the applicator nozzle at least temporarily, and/or the outlet mask is adapted to at least temporarily partially close the applicator nozzle.

13. The apparatus according to claim 8, further comprising:

an inflow controller that, influences an amount of the adhesive supplied to the application device and thereby determines a thickness of the adhesive coating, and/or determines a start and/or an end of the delivery of the adhesive by the application device.

14. The apparatus according to claim 8, further comprising:

a pressing device arranged and configured to press the carrier frame against the membrane and/or the electrode, and/or an adhesive curing device arranged and configured to cure the adhesive coating, and/or a separating device arranged and configured to separate a plurality of carrier frames continuously conveyed along a conveying path, and/or an inspection device arranged and adapted to detect a property defect and/or an arrangement defect of the membrane and/or electrode disposed on the adhesive coating.

* * * * *